United States Patent Office 3,399,218
Patented Aug. 27, 1968

3,399,218
OXIDATION CATALYSTS AND PROCESS FOR THEIR MANUFACTURE
Walter Wettstein, Chancy, near Geneva, Switzerland, assignor to Ciba Limited, Basel, Switzerland, a Swiss company
No Drawing. Continuation of application Ser. No. 492,346, Aug. 11, 1965. This application Mar. 24, 1967, Ser. No. 625,880
Claims priority, application Switzerland, Aug. 17, 1959, 77,043/59
2 Claims. (Cl. 260—385)

This application is a continuation of SN 492,346, filed Aug. 11, 1965, now abandoned, which is a division of application Ser. No. 332,957, filed Dec. 23, 1963, now abandoned, which in turn is a continuation-in-part of application Ser. No. 44,886, filed July 25, 1960, now abandoned.

The present invention provides a process for the manufacture of catalysts for oxidations in the gas phase of anthracene to anthraquinone, wherein a compound of manganese and/or of iron, prepared with exclusion of alkali metal ions, and containing anions of a vanadic acid, is mixed with an inert vehicle and heated at an elevated temperature.

Numerous processes are known for the catalytic oxidation of organic compounds in the gas phase. The majority of these processes are carried out with the use of oxides of vanadium as catalyst. The most prominent processes concern the oxidation of naphthalene to phthalic anhydride, the oxidation of benzene to maleic acid, and the oxidation of anthracene to anthraquinone.

To carry out a reaction of the specified kind it is in general necessary to use in each case a special catalyst having very specific properties, although some catalysts of the kind defined are capable of accelerating not only one but several of the aforementioned reactions, but the reaction does not always proceed advantageously and in the desired manner.

For example, for the oxidation of naphthalene to phthalic anhydride a conventional, very suitable catalyst consists of $SiO_2$, $K_2SO_4$, $K_2S_2O_7$ and $V_2O_5$. When such a catalyst is used for oxidizing anthracene, anthraquinone is formed very rapidly, but depending on the kenetic conditions there is formed as by-product 10–30% of phthalic anhydride so that the yield of anthraquinone is correspondingly reduced. Other catalysts have therefore been proposed for the oxidation of anthracene.

Inter alia, U.S. Patent No. 1,880,322, granted October 4, 1932, to Alphons O. Jaeger describes the oxidation of organic compounds, amongst them also anthracene, with the aid of distinctly alkaline catalyst mixtures containing, for example, vanadates, alkali metal salts and silicates.

It has, however, been observed that the catalysts described above are unable to ensure a good yield of anthraquinone over a prolonged operational period. More especially when commercial anthracene is used as starting material, the proportion of phthalic anhydride formed rises rapidly while the yield of anthraquinone drops. This requires periodical renewal of the catalyst or else it must be regenerated by a special process. Moreover, when a certain content of phthalic anhydride has been reached, it is no longer possible to separate the latter in a simple manner from the anthraquinone.

It has now been observed that the catalysts obtained by the present process, which contain a compound of manganese and/or of iron, prepared with exclusion of alkali metal ions, and containing anions of a vanadic acid, are particularly suitable for oxidation in the gas phase of anthracene to anthraquinone and that this type of catalyst ensures a consistently good yield of anthraquinone over a prolonged operational period; thus, the new catalysts are free from the aforementioned disadvantages of the known catalysts containing alkali metal salts.

In general the process for the manufacture of the compounds of manganese and/or of iron containing anions of a vanadic acid, which compounds serve as starting materials for the catalysts according to the present invention, consists in precipitation a solution of a salt of manganese and/or iron with a solution containing anions of a vanadic acid, for example a solution of ammonium vanadate. In carrying out this process it is of advantage to add ammonia prior to, during or following upon the precipitation in order to maintain the solution at an approximately neutral to weakly alkaline reaction.

The term "compounds of manganese and/or of iron containing anions of a vanadic acid" refers quite generally to such inorganic compounds as are obtained by precipitating a solution of a salt of manganese and/or of iron with a solution containing anions of a vanadic acid, if desired in the presence of ammonium ions. In this connection the term "anions of a vanadic acid" includes both simple vanadate ions such, for example, as meta- or ortho-vanadate ions, and vanadate ions of higher molecular weight such, for example, as ditetra- or penta-vanadate ions.

Owing to the relatively readily occurring change in valence of the manganese, iron or vanadic acid ions, the ions present in the precipitates defined above may possess a valence different from that of the starting material as a result of a change in valence occurring during or after the reaction, for example owing to an autoxidation of the iron or manganese ions.

The term "compounds of manganese and/or of iron containing anions of a vanadic acid" also includes precipitates that contain further ions present during the precipitation. Thus, for example, also ammonium ions may be present in the precipitate.

The active portion of the catalysts of the present invention is prepared by precipitating a solution containing 0.9 to 1.6 mols of a manganous and/or ferric salt, both free from alkali metal salts, with a solution containing 1 mol of ammonium vanadate, free from alkali metal salts, adjusting the pH with ammonia to a value between 6 to 7, preferably between 6.2 to 6.8, filtering and washing the precipitate and drying the resulting product.

The molecular proportions of the metals in the catalyst are per 10 atoms of vanadium, 9 to 16 atoms of manganese or of iron or of manganese and iron.

The manufacture according to the invention of a catalyst containing a manganese compound with a content of anions of a vanadic acid is advantageously carried out, for example, in the following manner:

A solution of a manganous salt, free from alkali metal salts, preferably a solution of manganous sulfate, $MnSO_4 \cdot 4H_2O$, manganous chloride, $MnCL_2 \cdot 4H_2O$, or manganous nitrate, $Mn(NO_3)_2 \cdot 6H_2O$ is precipiated with an ammonium vanadate solution, $NH_4VO_3$, and during or after the precipitation the weakly acid suspension is neutralized with dilute ammonia while being vigorously stirred. The exact pH value up to which ammonia can be advantageously added varies with the prevailing molecular ratio of manganese salt solution to ammonium vanadate solution. For example: When for this precipitation less than 1.5 mols, for example 1.0 to 1.25 mols, of manganous sulfate per mol of ammonium vanadate is used, a pH value of about 7, preferably 6.2 to 6.8, is particularly advantageous.

Alternatively the precipitation can be performed by using as starting material an ammonium vanadate solution rendered neutral to weakly alkaline with dilute ammonia and adding the manganese salt solution thereto. The manganese vanadate precipitate is then filtered, washed with ammonium sulfate solution of 0.3% strength and then with a small amount of distilled water, and dried. The dried precipitate is turned with a minimum of water into a still flowing paste, mixed with pumice stone granules until the latter are completely moist, the air is removed from the pores in the pumice stone by evacuation, and the paste is fixed on the granules by restoring atmospheric pressure. In this manner the granultes of pumice stone are covered with an even coat consisting of the precipitate, while the bulk of the water added is inducted into the inner pores of the granules. The granules prepared in this manner have a substantially dry surface so that they do not stick together.

The iron compound described above is manufactured according to the present invention in a similar manner by precipitating a solution containing 0.9 to 1.2 mols of a ferric salt and which is free from alkali metal salts, advantageously a solution of ferric sulfate, $Fe(SO_4)_3.9H_2O$, or ferric chloride, $FeCl_3.6H_2O$, with a solution containing 1 mol of ammonium vanadate and which is free from alkali metal salts, followed by neutralisation with dilute ammonia before, during or after the precipitation. The resulting precipitate is then worked up as described hereinbefore in connection with the manufacture of the manganese compound, that is to say, filtered, washed, dried, turned into a paste with water, fixed on an inert vehicle, for example granules of pumice stone, and dried at 90° C. A catalytic mass which contains manganese and a minor portion of iron possesses very advantageous properties. This mass has a very long operation period, i.e. the catalytic mass in the process of oxidation of anthracene to anthraquinone retains its activity without renewal for one year. Besides this, the oxidation of anthracene to anthraquinone can be performed at higher temperatures, namely at temperatures up to 440 to 460°. This makes it possible to use a relatively impure anthracene and to reduce the contact period which permits producing increasing quantities of anthraquinone. The catalytic mass containing manganese and iron is prepared by adding a solution of a ferric salt, as mentioned before, to a manganous salt, as mentioned before, and by adding ammonia immediately in order to obtain a pH of 5.5 to 6.0. This solution is mixed with the ammonium vanadate solution. After complete precipitation the pH is adjusted by further addition of ammonia to a value of 6.2–6.4. The precipitate is collected, washed, dried at temperatures of 110–120° C., pulverized, mixed with an inert vehicle and heated at temperatures above 550° C. The best results are obtained when there are used per 1 equivalent ammonium vanadate 0.9 to 1.2 equivalents of manganous salt, and per 1 equivalent of manganous salt 0.05–0.30 equivalent of ferric salt, i.e. per 10 atoms of vanadium there are present 9 to 12 atoms of manganese and per 10 atoms of manganese there are present 0.5–3 atoms of iron.

According to the present invention the catalyst granules are heated prior to use, for example before being charged into a catalyst tube, at a temperature between 550 to 800° C., preferably at a temperature ranging from 575–650° C. The optimum roasting temperature is determined by performing a trial roasting at a rising temperature, taking suitable specimens and testing the specimens in the catalyst furnace.

Vehicles suitable for the manganese and/or iron compounds mentioned above are, for example, kieselguhr, powdered pumice stone, and the like.

For use in a static catalyst bed the catalyst must be in lump form which can be prepared in various ways: For example, a mixture of active matter, vehicle and diluent is finely ground, moulded into pill form and activated by heating in a current of air; or, the manganese vanadate and/or ferric vanadate respectively is precipitated on the vehicle, ground with the diluent and the whole is moulded in the form of pills which are then activated by being roasted in a current of air. It is also possible to turn the mixture into a fine suspension by grinding or mixing it with a suitable liquid and the suspension is then fixed by spraying on a preformed vehicle, such as small pieces of pumice stone or earthenware shards, or the suspension is turned with a small amount of liquid into a kneadable paste which is then shaped on an extrusion press or through a perforated plate.

For preparing anthraquinone crude anthracene is vaporized with vapor of water and in the presence of air. The gases are brought into contact with the catalytic mass at a temperature ranging from 370, preferably from 400 to 460° C. The contact period of the gases ranges from 0.5 to 2, preferably from 0.7 to 1.5 seconds. The value of W/F, which corresponds to $$\frac{\text{weight of catalytic mass in g.}}{\text{feed of anthracene in g./sec.}}$$

ranges from 20,000 to 35,000, preferably from 25,000–30,000 sec., and the charge, corresponding to g. anthracene/m.$^3$ air, ranges from 15–30, preferably from 19–25 g./m.$^3$.

Example 1

203 grams of $MnSO_4.H_2O$ (1.2 mols) are dissolved with stirring in 2.1 liters of distilled water at 50° C.

Furthermore, a solution of ammonium vanadate is prepared by introducing 117 grams (1 mol) of ammonium meta-vanadate $NH_4VO_3$ into 2.5 liters of boiling distilled water, cooling to 50° C., and adding 900 cc. of N-ammonia solution. The ammonium vanadate solution is stirred at 50° C. in a fine stream into manganous sulfate solution. On completion of the precipitation the pH value is 5.8. The reaction mixture is slowly neutralized while being vigorously stirred with 50 cc. of N-ammonia solution until a pH value of 6.3 has been reached, then filtered, washed with 5 liters of ammonium sulfate solution of 0.3% strength and then with 1 liter of distilled water, filtered, and the filter cake is dried under vacuum.

There are obtained 157 grams of a brown, rather hard cake which is ground for one hour in a rod mill to form a rust-brown powder.

To form the catalyst, 49 grams of said powder are mixed with 119 cc. of water and about 120 china spheres of 12 mm. diameter, introduced into a jar of 2 liters capacity, and the jar is rolled for 90 minutes at about 80 revolutions per minute. After this time the powder has been converted into a smooth paste which still flows readily. 700 cc. of pumice stone granules of 3–8 mm. diameter are then added and the whole is rolled in the manner described for 5 minutes until the granules are thoroughly moist. The paste is then fixed on the pumice stone by being evacuated once or twice and the granules which at this stage hardly show any tendency to stick together are heated at 90° C.

The granules are then roasted at a slowly rising temperature and from time to time specimens are taken which are then tested in the following manner:

About 3.5 cc. of granules are charged into a U-shaped contact tube of about 8 mm. inside diameter which is immersed in a nitrate melt heated at 370° C. Through the contact tube there is then passed at a rate of 50 cc. per minute a current of air containing per liter 0.02 gram of commercial anthracene of 95% purity containing about 0.05% of combined sulfur. After having passed through the contact tube the current of air is cooled in a weighed, air-cooled precipitation tube ground into the contact tube in which the solid reaction products are collected.

After 0.300 gram of commercial anthracene (=0.285 gram of anthracene of 100% purity) has passed through the contact tube, the precipitate tube is weighed and its content is analyzed in the following manner:

The reaction products are flushed with about 100 cc. of sodium hydroxide solution of 1% strength into a beaker, the whole is left to itself for one hour, then filtered through a weighed glass frit filter, washed with distilled water and dried at 50° C. The loss in weight of alkali-soluble reaction products corresponds substantially to the phthalic anhydride formed and is recorded as such in the following table. In the alkali-insoluble phase the anthracene content is determined colorimetrically in the following manner:

A solution of 0.100 gram of the product in 2 cc. of concentrated sulfuric acid is kept for 10 minutes in the dark while being repeatedly agitated and the resulting coloration is compared colorimetrically with a control scale obtained with solutions of mixtures of pure anthracene and pure anthraquinone in concentrated sulfuric acid.

The following table gives the results of the tests carried out with catalyst granules roasted at different temperatures:

The two solutions are combined with stirring and neutralized with about 2200 cc. of N-ammonia solution to establish a pH value of 6.5; the suspension is then stirred on for one hour, filtered, and washed first with 5000 cc. of ammonium chloride solution of 0.3% strength and then with 5000 cc. of distilled water. The filter cake is dried under reduced pressure and ground for 15 minutes in a rod mill. There are obtained about 187 grams.

5.8 grams of the dried and ground product are rolled with 15 china spheres of 12 mm. diameter and 15 cc. of water in a jar of 200 cc. capacity for 60 minutes at 120 revolutions per minute, whereby the product is turned into a smooth paste which still flows readily. 100 cc. of pumice stone granules of 3–7 mm. diameter are then

| Roasting temperature, °C. | Roasting time, minutes | Anthracene (95%) evaporated, grams | Equal to anthracene 100%, grams | Crude anthraquinone, grams | Phthalic anhydride, grams | Anthracene (colorimetrically found), grams | Pure anthraquinone, grams | Percent of theory |
|---|---|---|---|---|---|---|---|---|
| 450 | 30 | 0.300 | 0.285 | 0.244 | 0.011 | 0 | 0.233 | 69.5 |
| 550 | 30 | 0.300 | 0.285 | 0.282 | 0.002 | 0 | 0.280 | 84.0 |
| 575 | 30 | 0.300 | 0.285 | 0.298 | 0.004 | 0 | 0.294 | 88.2 |
| 600 | 30 | 0.300 | 0.285 | 0.303 | 0.004 | 0 | 0.299 | 89.8 |
| 600 | 60 | 0.300 | 0.285 | 0.313 | 0.005 | 0.003 | 0.305 | 91.6 |

Corresponding results were obtained with catalysts prepared in the manner described above from manganous chloride instead of from manganous sulfate.

Corresponding results were likewise achieved when a constant pH value of about 7 was maintained during the addition of the manganous sulfate to the ammonium vanadate solution from the beginning of the precipitation by simultaneously adding dilute ammonia solution.

Example 2

A catalyst which had been prepared as described in Example 1 and finally roasted for 1 hour at 575° C., was subjected to a long-term test as follows:

A current of air (1200 cc. per minute) was conveyed over solid commercial anthracene containing 95% of anthracene and 0.05% of combined sulfur, heated at 165° C., during which the air absorbed about 20 grams of anthracene per cubic meter and passed them into a contact tube of stainless steel of an inside diameter of 24 mm. which was heated at 380° C. by means of a nitrate melt and contained 50 cc. of the catalyst mentioned above. At the exit of the contact tube the gas current was cooled to about 50° C. and the reaction products were collected in a cotton filter. The reaction products were weighed periodically and analyzed as described in Example 1, the amount of evaporated anthracene being determined by weighing the evaporator once more.

The following table shows the test results according to the test period and the total amount of anthracene passed:

added and the whole is further rolled until all granules are moist with paste, and the jar is then evacuated by means of a water-jet pump to about 30 mm. Hg pressure while being slowly revolved. When atmospheric pressure is restored, the paste is pressed very evenly on to the surface of the granules so that the latter no longer stick together. The granules are then dried at 90° C. and then roasted at a slowly rising temperature. From time to time specimens are taken which are tested in the following manner:

About 3.5 cc. of granules are introduced into a U-shaped contact tube of about 8 mm. inside diameter which is immersed in a nitrate melt heated at 370° C. Through the contact tube a current of air is passed at a rate of 50 cc. per minute which contains per liter 0.020 gram of commercial anthracene of 95% purity containing about 0.05% of combined sulfur. After having passed the contact tube the air current is cooled in an air-cooled precipitation tube ground into the contact tube and the solid reaction products are collected in the precipitation tube. When 0.300 gram of commercial anthracene, corresponding to 0.285 gram of anthracene of 100% purity, has passed through the contact tube, the precipitation tube is weighed and its content is analysed in the following manner:

The reaction products are flushed with about 100 cc. of sodium hydroxide solution of 1% strength into a beaker, the whole is left to itself for one hour, then filtered through a weighed glass frit filter, washed with distilled water and dried at 50° C. The loss in weight

| Week | Anthracene (95%) total, grams | Anthracene (95%) test period, grams | Equal to anthracene 100% test period, grams | Crude anthraquinone test period, grams | Percent phthalic anhydride test period | Percent anthracene | Equal to anthraquinone 100% | Percent of theory |
|---|---|---|---|---|---|---|---|---|
| 1 | 234 | 234 | 222 | 240 | 2.7 | 0.3 | 233 | 89.7 |
| 2 | 482 | 248 | 236 | 256 | 2.6 | 0.3 | 249 | 90.1 |
| 5 | 1,162 | 226 | 215 | 234 | 2.3 | 0.2 | 228 | 90.6 |
| 10 | 2,193 | 236 | 224 | 243 | 2.2 | 0.2 | 237 | 90.4 |

The above table shows that the catalyst remained unchanged during the test period.

Example 3

A solution of 270 grams (1 mol) of FeCl$_3$.6H$_2$O in 2500 cc. of water is heated in a stirring flask to 50° C.

A solution of primary ammonium vanadate is then prepared by introducing 117 grams (1 mol) of ammonium meta-vanadate NH$_4$VO$_3$ into 2500 cc. of boiling water and the solution is then cooled to 50° C.

of alkali-soluble reaction products corresponds substantially to the phthalic anhydride formed and is recorded as such in the following table. In the alkali-insoluble phase the anthracene content is determined colorimetrically in the following manner:

A solution of 0.100 gram of the product in 2 cc. of concentrated sulfuric acid is kept for 10 minutes in the dark while being repeatedly agitated and the resulting coloration is compared colorimetrically with a control scale obtained with solutions of pure anthraquinone and pure anthracene in concentrated sulfuric acid.

The following table gives the results of the tests carried out with catalyst granules roasted at different temperatures:

| Roasting temperature, °C. | Roasting time, minutes | Anthracene (95%) evaporated, grams | Equal to anthracene 100% evaporated, grams | Yield of crude anthraquinone, grams | Yield of phthalic anhydride, grams | Anthracene (determined colorimetrically), grams | Pure anthraquinone, grams | Percent of theory |
|---|---|---|---|---|---|---|---|---|
| 400 | 60 | 0.300 | 0.285 | 0.176 | 0.014 | 0 | 0.162 | 48.6 |
| 600 | 60 | 0.300 | 0.285 | 0.305 | 0.013 | 0 | 0.292 | 87.6 |
| 625 | 60 | 0.300 | 0.285 | 0.308 | 0.012 | 0 | 0.296 | 88.9 |
| 650 | 60 | 0.300 | 0.285 | 0.313 | 0.008 | 0.0015 | 0.303 | 90.9 |
| 675 | 60 | 0.300 | 0.285 | 0.317 | 0.013 | 0.0005 | 0.303 | 90.9 |

The catalyst roasted at 650° C. was subjected to a long-term test and displayed practically no change after a test period of 10 weeks. Similar results were obtained with catalysts prepared in the manner described with the use of ferric sulfate instead of ferric chloride. Similar results were likewise obtained when during the addition of the ferric chloride to the ammonium vanadate solution a constant pH value of about 7 was maintained from the beginning of the precipitation by simultaneously adding dilute ammonia solution.

Example 4

The following molar proportions are used:

| | Mol |
|---|---|
| Ammonium meta-vanadate | 1.000 |
| Manganese chloride | 0.900 |
| Ferric chloride | 0.100 |

178 kg. of $MnCl_2 \cdot 4H_2O$ are dissolved at 50° C. in 500 to 1000 litres of water. The solution is diluted with water to make up 4000 litres. 27.1 kg. of $FeCl_3 \cdot 6H_2O$ are then added and the pH of the solution adjusted immediately to 5.7 to 5.8 by adding about 6 kg. of $NH_3$ of 100% strength or about 150 litres of $NH_3$ of 6% strength, and the whole is then heated to 80° C.

117 kg. of ammonium meta-vanadate are dissolved in 2500 litres of water at 95° C. and then cooled to 90–80° C. The solution is allowed to flow in the course of about 15 minutes, while being stirred well, into a precipitation vessel maintained at 80° C., the pH value being kept between 5.5 to 6.0 by the further addition of ammonia solution. The batch is stirred for half an hour, the pH value of the batch being 6.2–6.3. The precipitate is then filtered off, while still hot, with a suction-filter equipped with stirrer or in a filter press. Washing is carried out with 3×1500 litres of ammonium sulfate solution of 0.3% strength and finally twice with 1500 litres of water. The last washing water is practically free from chloride and sulfate. Depending on the filter method used, the dry content amounts to 30–50%. The catalytic mass is dried at 110–120° C. and ground by being passed twice through a hammer mill with a 1/10" sieve. Yield: 175 kg.

320 kg. of pumice, sieved through a 3/16" screen, are impregnated with a slurry of 51 kg. of the catalytic mass in 110 litres of water having a temperature of 50° C. The moist material is calcined at temperatures ranging from 580 to 650° C.

An oven contains 1150 kg. or 2300 litres of the above catalyst distributed in 8 chambers. The reaction temperature can be regulated by means of cooling coils in each chamber. The operation is carried out at a rising temperature of 400–460° C., the higher temperature towards the reactor outlet having a favourable effect on the combustion of the byproducts stemming from the impure anthracene.

145 kg. per hour of anthracene of 91% strength are passed through a nozzle with vapour into 7800 m.³ air of normal conditions and the mixture fed into the oven the following data resulting:

| | | |
|---|---|---|
| Contact time | sec | 0.73 |
| W/F | sec | 28.500 |
| Concentration: Anthracene/m.³ air g./m.³ | | 16.9 |

In a month 95 tons of anthracene of 100% strength are passed through and 102 tons of anthraquinone with an average purity of 99.5% are obtained, which corresponds to 91.5% of the theoretical yield.

I claim:
1. A process for the manufacture of anthraquinone by oxidation in the gaseous phase of anthracene in which process anthracene is contacted in the presence of air at a temperature between 400 to 460° C. with a catalytic mass obtained by drying, mixing with an inert vehicle, and heating at a temperature between 550 to 800° C. a precipitate prepared with exclusion of alkali metal ions of obtained at a pH-value of 6 to 7 from 1 mole of ammonium vanadate, 0.9 to 1.2 moles of an inorganic water-soluble manganous salt and, calculated per one mole of said manganous salt, 0.05–0.30 mole of an inorganic water-soluble ferric salt.

2. A process according to claim 1 wherein the manganous salt is a member selected from the group consisting of manganous chloride and manganous sulfate, and the ferric salt is ferric chloride.

References Cited

UNITED STATES PATENTS

| | | | |
|---|---|---|---|
| 1,558,598 | 10/1925 | Ellis | 252—456 |
| 1,787,417 | 12/1930 | Wohl | 260—385 |
| 1,941,688 | 2/1934 | Jaeger | 260—385 XR |
| 2,180,353 | 11/1939 | Foster | 23—234 |
| 2,824,880 | 2/1958 | Wettstein | 260—385 |
| 2,954,385 | 9/1960 | Burney et al. | 260—385 XR |

LORRAINE A. WEINBERGER, *Primary Examiner.*

H. C. WEGNER, *Assistant Examiner.*